No. 880,502. PATENTED MAR. 3, 1908.
E. J. BOYLER.
CARBURETER FOR EXPLOSIVE ENGINES.
APPLICATION FILED JUNE 1, 1906.
2 SHEETS—SHEET 1.
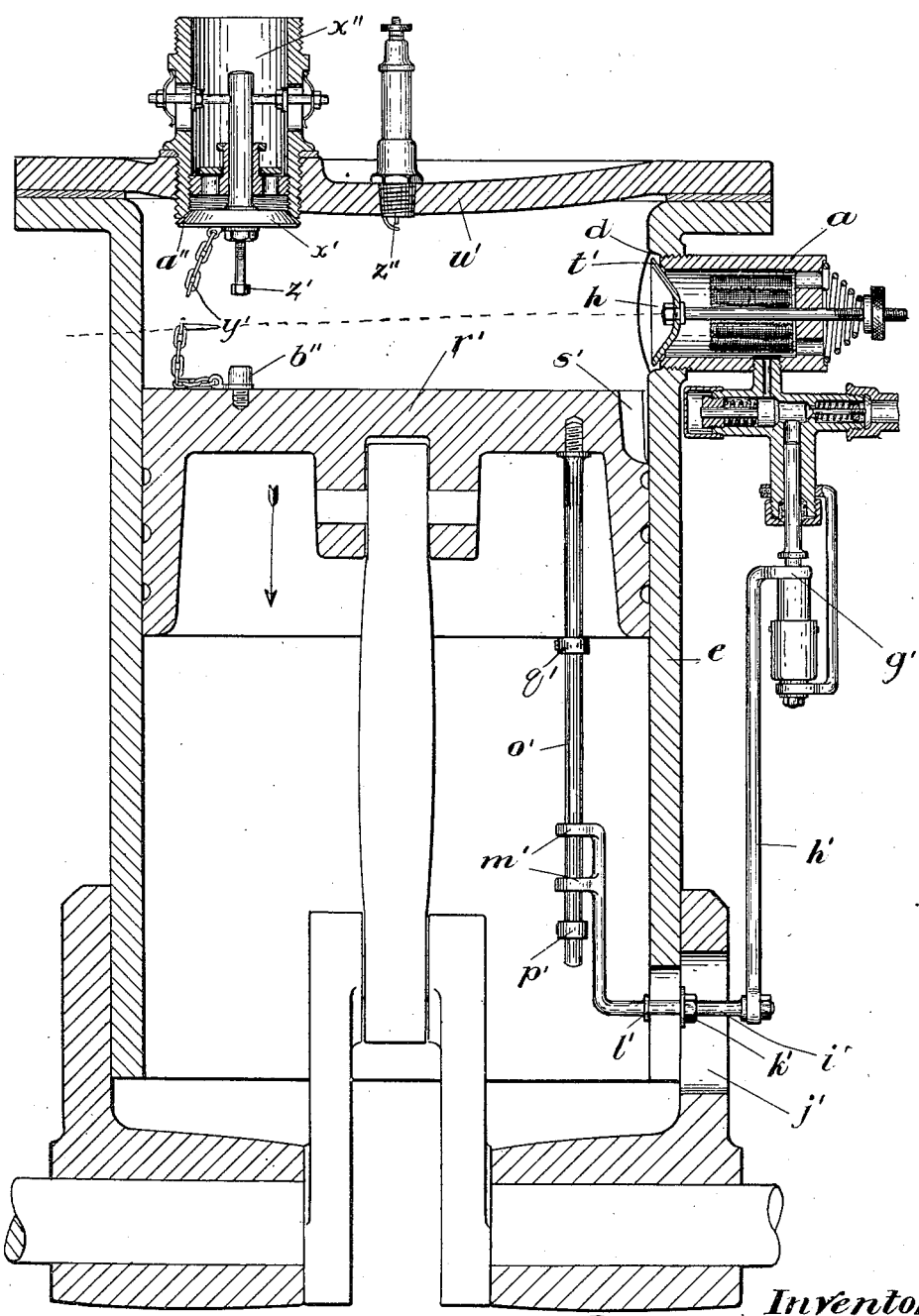
Witnesses.
Fig. 1.

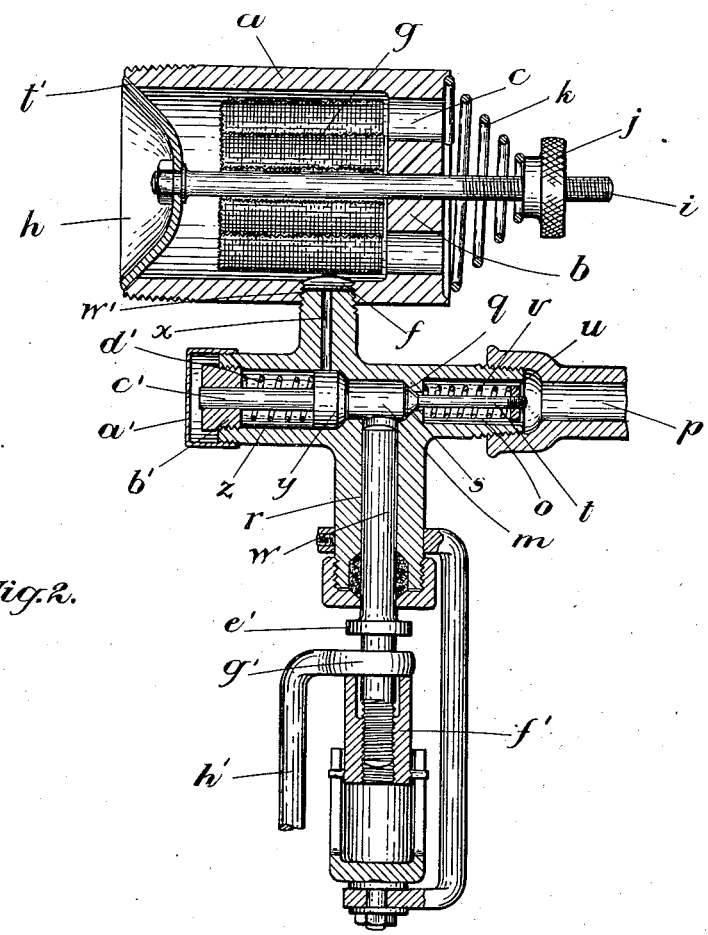

UNITED STATES PATENT OFFICE.

EMANUEL J. BOYLER, OF PETERBOROUGH, ONTARIO, CANADA, ASSIGNOR OF TWO-THIRDS TO COURTLAND JOHN AGGETT AND ANGUS STALKER, OF PETERBOROUGH, CANADA.

CARBURETER FOR EXPLOSIVE-ENGINES.

No. 880,502.     Specification of Letters Patent.     Patented March 3, 1908.

Application filed June 1, 1906. Serial No. 319,768.

*To all whom it may concern:*

Be it known that I, EMANUEL JOHN BOYLER, of the city of Peterborough, in the county of Peterborough and Province of Ontario, Canada, have invented certain new and useful Improvements in Carbureters for Explosive-Engines; and I hereby declare that the following is a full, clear, and exact description of the same.

This invention relates to a carbureter for an explosive engine, comprising a mixing chamber, having a fuel inlet and an air inlet, an atomizer opposed to the fuel inlet and a valve controlled gas outlet, and an injector comprising a valve controlled fuel chamber to be connected with the fuel supply, a sucker to create a partial vacuum in the fuel chamber, an outlet from the fuel chamber to the mixing chamber and a spring actuated valve to control the fuel outlet, as hereinafter described and specifically pointed out in the appended claims.

For a full understanding of the invention reference is to be had to the following description and to the accompanying drawings in which Figure 1 is a longitudinal section of an explosive engine with the carbureter attached thereto, and Fig. 2 is a section of the carbureter on a larger scale than in Fig. 1.

Like characters of reference refer to like parts throughout the specification and drawings.

The mixing chamber $a$ of the carbureter is provided with a head $b$ at its outer end through which is formed the air inlets $c$ and the inner end of the mixing chamber $a$ is screw threaded. Formed through the cylinder casing $e$ is a screw threaded aperture $d$ to receive the screw threaded end of the mixing chamber $a$. Formed through the side of the mixing chamber $a$ is the fuel inlet $f$ and contained within the mixing chamber is an atomizer $g$ opposed to the fuel inlet $f$. Closing the inner end of the mixing chamber $a$ is a valve $h$ and connected to the valve $h$ is a valve stem $i$ which extends through the mixing chamber $a$ and beyond the outer side of the head $b$. Mounted upon the valve stem $i$ on the outer side of the head $b$ is an adjustable nut $j$ and coiled around the valve stem $i$ and bearing against the head $b$ and nut $j$ is a spring $k$, which normally holds the valve $h$ against its valve seat $t'$. The shell of the injector consists of a fuel chamber $m$, a fuel inlet $o$ to be connected to the fuel supply source $p$, a valve seat $q$ interposed between the fuel inlet $o$ and the fuel chamber and a slideway $r$ at right angles to the fuel chamber $m$ and in communication with the latter. Contained within the fuel chamber $m$ is a valve $s$ having a valve stem $t$ projecting into the fuel inlet $o$ and adjustable on the valve stem $t$ is a nut $u$. Coiled upon the valve stem $t$ between the nut $u$ and the adjacent surface of the valve seat $q$ is a spring $v$ which normally holds the valve $s$ against the valve seat. Movable in the slideway $r$ is a sucker $w$. The fuel chamber $n$ has an outlet $x$ and controlling the outlet $x$ is a spring actuated valve $y$ movable in the valve chamber $z$.

The valve chamber $z$ as shown in the drawing, is located vertically below the fuel chamber $m$. Fitted on the injector shell at the end of the valve chamber $z$ is a cup $a'$ which receives any leakage through the plug $b'$ closing the end of the valve chamber. The valve $y$ is provided with a valve stem $c'$ movable through the plug $b'$ and coiled on the valve stem $c'$ between the plug $b'$ and valve $y$ is a spring $d'$. As shown in the drawing, the sucker $w$ beyond the slideway $r$ is formed with a shoulder $e'$ and that portion of the sucker projecting beyond the shoulder $e'$ is screw threaded to receive an adjustable nut $f'$. Embracing the sucker $w$ between the shoulder $e'$ and nut $f'$ is the eye $g'$ of the link $h'$, connected to and movable with the sliding crank $i'$. In the cylinder casing $e$ is a slideway $j'$ in which the sliding crank $i'$ is longitudinally movable, and fitted on the sliding crank $i'$ are collars $k'$ and $l'$ which engage the outer and inner sides of the cylinder casing to maintain the sliding crank $i'$ in a position at substantially right angles to the cylinder casing when moving in the slideway. The sliding crank $i'$ within the inner face of the cylinder casing $e$, is formed with eyes $m'$ through which is longitudinally movable the piston bar $o'$, and adjustable on the piston bar $o'$ are two nuts $p'$ and $q'$. The piston bar $o'$ is connected to and movable with the piston head $r'$.

As shown in Fig. 1, of the drawings, that part of the piston head $r'$ which comes into position opposite the valve $h$ has a recess $s'$ to permit of the opening movement of the valve $h$ for the admission of gas from the mixing chamber into the engine cylinder. The mixing chamber is fitted to the aperture $d$ and the valve $h$ opens from its valve seat $t'$ inwardly into the engine cylinder. When the piston head is in the position shown in Fig. 1 of the drawings, gas is admitted from the mixing chamber into the space between the piston head $r'$ and cylinder head $u'$. When the gas has been admitted to the engine cylinder, the spring $k$ closes the valve $h$ against its valve seat $t'$ to prevent the exit of the gas from the engine cylinder through the mixing chamber and coincident with the closing of the valve $h$ the spark from the spark igniter $z''$ explodes the gas to move the piston head in the direction indicated by arrow in Fig. 1, and force the piston head to the outer end of its stroke. During the outward movement of the piston head the nut $q'$ engages the eye $m'$ and causes the sliding crank $i'$ to move in the same direction and carry with it the link $h'$ in the direction indicated by arrow. This movement of the link $h'$ draws the sucker $w$ outwardly in the slideway and expands the contents of the fuel chamber $m$ to create a partial vacuum therein, under the influence of which the pressure of the fuel in the fuel inlet $o$ opens the valve $s$ and enters the fuel chamber $m$. The valve $y$ is at that time positioned to close the outlet $x$ from the valve chamber. During the return stroke of the piston head $r'$ and piston bar $q'$, the nut $p'$ comes into contact with the eye $m'$ and moves the sliding crank $i'$ in the opposite direction to move the sucker $w$ inwardly in the slideway $r$. The inward movement of the sucker compresses the contents of the fuel chamber $m$ to tightly close the valve $s$ against its valve seat $q$ and move the valve $y$ to open the outlet $x$ from the fuel chamber into the mixing chamber so that when the sucker has completed its stroke, the selected quantity of the fuel will be ejected from the fuel chamber through the outlet $x$ into the mixing chamber.

To atomize the fuel, the outlet $x$ is provided with an atomizer $w'$ which breaks up the fuel into fine sprays to effect its rapid vaporization, and the vaporization is further accelerated by the contact of the sprays with the atomizer $g$ contained in the mixing chamber. The fuel during its vaporization in the mixing chamber is combined with air admitted through the air inlets $c$, and while the mixing of the air and fuel is taking place, the piston head $r'$ completes its return stroke by moving in the engine cylinder to the position indicated by the dotted line therein and then commences its outward stroke. When it has attained the position on its outward stroke shown in Fig. 1 of the drawings, it forms a partial vacuum in the engine cylinder and creates a suction which enables the contents of the mixing chamber to force the valve $h$ from its valve seat and pass into the engine cylinder.

When the contents of the mixing chamber have passed into the engine cylinder the spring $k$ automatically closes the valve $h$ against its valve seat to prevent the gas returning from the engine cylinder to the mixing chamber. When the explosion occurs, the piston head moves outwardly towards the end of the engine cylinder under the force of the expansion of the exploded gas, and when it has completed its outward movement it opens the exhaust valve $x'$ by means of the chain $y'$ connected to the piston head and to the exhaust valve so that during the return movement of the piston head the exploded gas can be exhausted from the cylinder through the exhaust port $x''$. As the piston head completes its return movement, it engages the projection $z'$ of the exhaust valve and moves the exhaust valve against its valve seat $a''$ to close the exhaust port $x''$. The projection $z'$ is adjustably connected to the exhaust valve $x'$ and the piston head $r'$ is provided with an adjustable bumping pin $b''$ by which the exhaust valve can be closed at any selected part of the return stroke of the piston head.

Having thus fully described my invention what I claim as new and desire to secure by Letters Patent is:

1. An explosive engine comprising a cylinder open at one end and having a cylinder head at the other end, a piston in the cylinder, a mixing chamber having air inlets and opening into the cylinder near the cylinder head and provided with a spring pressed valve to control its opening into the cylinder, a fuel chamber, a fuel inlet for the fuel chamber, a valve for the fuel inlet, an extension of the fuel chamber having a central bore communicating with the fuel chamber, a plunger reciprocally movable in the central bore of the extension, a slideway formed through the cylinder near its open end, a plunger actuating rod extending through, and slidable in, the slideway, means connected with the piston for operating the plunger actuating rod, a fuel exit for the fuel chamber connecting the latter with the mixing chamber, and a spring controlled valve for the inner end of the fuel exit.

2. An explosive engine comprising a cylinder open at one end and having a cylinder head at the other end, a piston in the cylinder, a mixing chamber having air inlets and opening into the cylinder near the cylinder head and provided with a spring pressed valve to control its opening into the cylinder, a fuel chamber, a fuel inlet for the fuel chamber, a valve for the fuel inlet, an extension of the fuel chamber having a central bore communicating with the fuel chamber, a plunger reciprocally movable in the central bore of the extension, collars on the plunger, a slideway formed through the cylinder near its open end, a plunger actuating rod consisting of a slide part extending through and slidable in, the slideway, a part extending at right angles to the slide part at the outer end of the latter connected to the plunger between the collars thereof, and a second part extending at right angles to the slide part at the inner end of the latter, means fixed to the piston actuating said last mentioned part, a fuel exit for the fuel chamber connecting the latter with the mixing chamber, and a spring controlled valve for the inner end of the fuel exit.

3. An explosive engine comprising a cylinder open at one end and having a cylinder head at the other end, a piston in the cylinder, a mixing chamber having air inlets and opening into the cylinder near the cylinder head and provided with a spring pressed valve to control its opening into the cylinder, a fuel chamber, a fuel inlet for the fuel chamber, a valve for the fuel inlet, an extension of the fuel chamber having a central bore communicating with the fuel chamber, a plunger reciprocally movable in the central bore of the extension, collars on the plunger, a slideway formed through the cylinder near its open end, a plunger actuating rod consisting of a slide part extending through and slidable in, the slideway, a part extending at right angles to the slide part at the outer end of the latter connected to the plunger between the collars thereof, and a second part, having an apertured offset, extending at right angles to the slide part at the inner end of the latter, a rod connected at one end to the piston and passing through the aperture of the offset, collars on the rod on either side of the offset, so spaced as to engage therewith and effect a movement of the slide part at each end of the piston stroke, a fuel exit for the fuel chamber connecting the latter with the mixing chamber, and a spring controlled valve for the inner end of the fuel exit.

Toronto, May 7th, A. D., 1906.

EMANUEL J. BOYLER.

Signed in the presence of—
CHAS. H. RICHES,
H. L. TRIMBLE.